United States Patent
Cere

[11] 3,882,020
[45] May 6, 1975

[54] CONCENTRATE DILUTER FOR PREPARING DIALYSIS LIQUID IN ARTIFICIAL KIDNEYS

[75] Inventor: Sergio Cere, Mirandola, Italy
[73] Assignee: Bellco S.p.A., Mirandola-Modena, Italy
[22] Filed: May 13, 1974
[21] Appl. No.: 469,573

[30] Foreign Application Priority Data
May 25, 1973  Italy .................................. 3415/73

[52] U.S. Cl. ..................... 210/85; 210/96; 210/321
[51] Int. Cl. ............................................ B01d 31/00
[58] Field of Search ................. 210/22, 85, 96, 321

[56] References Cited
UNITED STATES PATENTS
3,508,656  4/1970  Serfass et al. .................... 210/321 X
3,722,680  3/1973  Smith ............................. 210/195 X Primary Examiner—Frank A. Spear, Jr.
Attorney, Agent, or Firm—Dr. Guido Modiano; Dr. Albert Josif

[57] ABSTRACT

Concentrate dilutor for preparing dialysis liquid in artificial kidneys comprising flexible ducts for feeding the concentrate and degassed and heated water to a mixing connector. Peristaltic pumping means are provided for transporting the concentrate and the water along the feeding ducts.

Between the mixing connector and the dialyser a conductivity cell is disposed for governing regulating means of the dilution of the concentrate. A flow deviator provided upstream of the dialyser is arranged to block the flow of the preparation towards the dialyser and to deviate it to an intermediate container. There are also provided means for measuring the temperature and conductivity of the liquid in the container for controlling the flow deviator.

8 Claims, 2 Drawing Figures

PATENTED MAY 6 1975 3,882,020

CONCENTRATE DILUTER FOR PREPARING DIALYSIS LIQUID IN ARTIFICIAL KIDNEYS

BACKGROUND OF THE INVENTION

This invention relates to a concentrate diluter for preparing dialysis liquid in artificial kidneys.

Dialysis liquid is a mixture of partially degassed water and a particular concentrate in the required proportions. In artificial kidneys it is extremely important that the dialysis liquid, to which the blood gives up its impurities during its passage through the dialyser, remains at a constant temperature and at a constant concentration ratio.

The constancy of the temperature is important in order to avoid irreparable modifications occurring in the haematic flow, which is indirectly heated by the dialysis liquid in the dialyser. On the other hand it is fundamental that the dilution ratio of the water to the concentrate is kept within the desired limits.

The fundamental disadvantage of known diluters consists of the fact that each time they are used they have to be sterilized by complicated methods. To carry out this sterilization certain parts have first to be dismantled and then reassembled. Furthermore the degree of sterilization of those areas of the plant which remain inaccessible is not perfectly certain.

SUMMARY OF THE INVENTION

The object of this invention is to provide a concentrate diluter which allows exact determination and automatic correction of the concentration ratio and temperature of the dialysis liquid.

A further important object of the present invention is to provide a diluter in which the parts to be sterilized are wholly of the disposable type and are replaceable by others previously sterilized, so as to eliminate the traditional sterilization stage and at the same time ensure a perfectly sterile diluter, with a reduction in the sterilization cost.

A further object of the present invention is to make the assembly and dismantling of the replaceable parts extremely simple and rapid, and able to be carried out by personnel without specific training, so as to make the use of the artificial kidney as least related as possible to the presence of specialised personnel.

These and further objects which will be more evident hereinafter are attained by a concentrate diluter for preparing dialysis liquid in artificial kidneys, comprising a flexible duct for feeding water which has been previously degassed and heated to a predetermined temperature, and a flexible duct for feeding the concentrate, means for the peristaltic pumping of the degassed water and the concentrate along said ducts, a connector for said ducts arranged to mix the water with the concentrate and convey the preparation so obtained towards the dialyser through a duct along which is disposed a conductivity cell on which depend the means for regulating the dilution of concentrate in the degassed water, a container provided with an overflow and connected to the feed duct for the dialyser by a pair of ducts, one of which feeds a constant fraction of the preparation to the container, and a flow deviator arranged to block the flow of the preparation towards the dialyser, leaving simultaneously open the second of said pair of ducts or vice versa, there being also provided means for measuring the temperature and conductivity of the liquid in the container, and which govern said deviator.

BRIEF DESCRIPTION OF THE DRAWINGS

Further particulars of the invention will be more evident from the detailed description given hereinafter of a preferred embodiment illustrated by way of example in the accompanying drawing in which.

DESCRIPTION OF THE PREFERRED EMBODIMENTS

Figure 1:
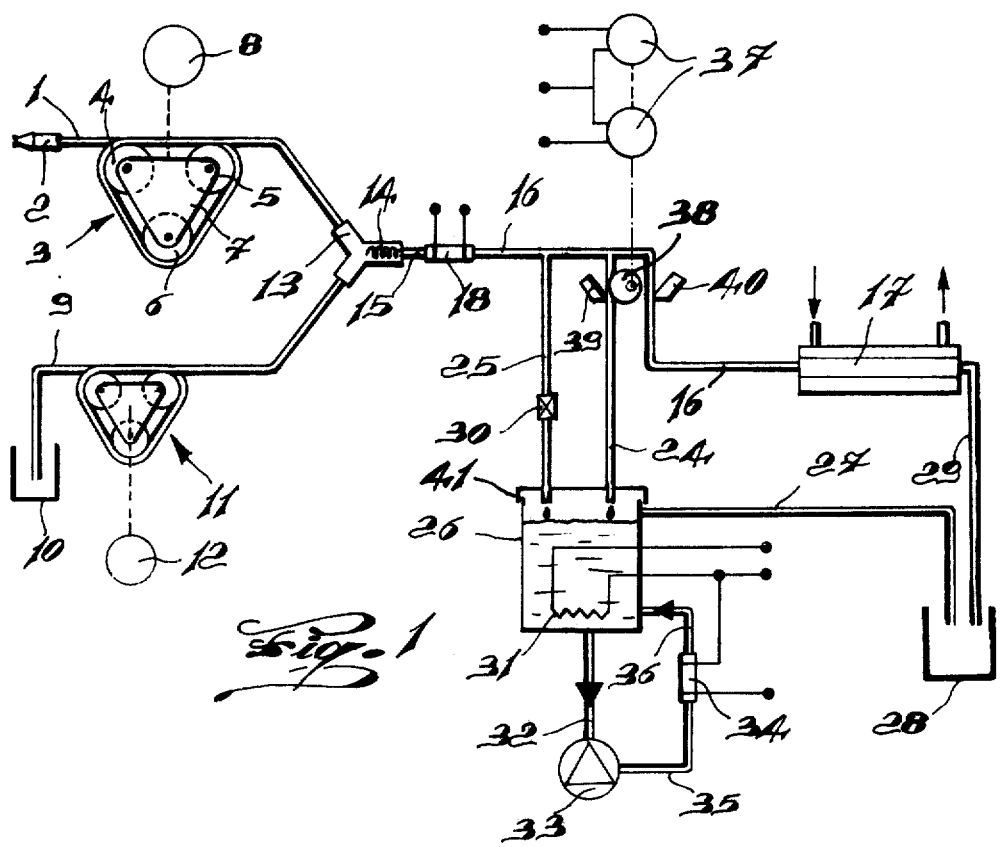
FIG. 1 is a diagrammatic arrangement of the diluter according to the invention and FIG. 2 is a longitudinal section through a conductivity cell.

The figures show a flexible feed tube 1 for the water previously degassed and heated to a temperature close to body temperature, and provided with a rapid action connector 2 for its connection to the fixed hydraulic system for degassing and heating the water. This system comprises equipment of common use and is not represented in detail.

The water is thrust along the duct 1 by a peristaltic pump 3, composed of three idle rollers 4, 5, 6 with their axes parallel to each other and disposed at the vertices of an equilateral triangle and supported by a plate 7 rigid with the exit shaft of an electric motor 8. When the pump is operated it produces a deformation of the flexible tube 1 by squeezing, and this deformation moves along the tube at the rollers 4, 5, 6 because of the rotation of the pump, and transmits advancement impulses to the water.

The concentrate to be mixed with the water for preparing the dialysis liquid is withdrawn through a flexible tube 9 from a container 10 by a pump 11 of the peristaltic type analogous to that described in relation to the pump 3, and is operated by a further electric motor 12.

The delivered water and concentrate flow together at a connector 13 of substantially Y form. In that portion of said connector through which the preparation flows out there is suitably disposed a cylindrical spiral 14 which intensifies the mixing of the stream of preparation so as to make the solution of water and concentrate more uniform, to avoid errors in measuring the concentration of this solution and hence avoid untimely processes of correction.

Between the ducts 15, 16 which extend from the connector 13 to the dialyser 17 and which also consist of flexible tubes, is inserted a conductivity cell or probe 18 able to measure the conductivity of the dialysis liquid as a function of the concentration and temperature of the dialysis liquid.

Figure 2:
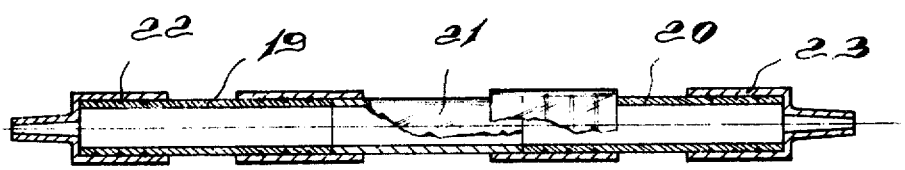

This probe, which governs the regulating device for the dilution, is shown in detail in FIG. 2 and comprises two metal sleeves, 19, 20 connected together by an intermediate portion 21 of insulating plastics material having a thickness such that the internal bore of the probe has a constant diameter so as to avoid obstructing the liquid stream flowing through it.

On the opposite ends of the sleeves 19, 20 are fixed caps 22, 23 with conical portions for insertion into the ducts 15 and 16 respectively. Between the caps 22, 23 and adjacent to the ends of the intermediate portion 21 there are uncovered accessible zones of the sleeves 19, 20 for connecting electric terminals serving the said dilution regulating device. This device may for example be an electronic control stage for the feed voltage of the motors 8, 12 which operate the pumps 3, 11. Hereinafter it will be supposed that this acts only on the pump 11 by regulating the speed of the motor 12.

Two flexible tubes 24, 25 branch from the duct 16 and open into a container 26 provided with an overflow duct 27 which feeds into a drain pot 28. The dialysis liquid which leaves the dialyser is taken to the same drain pot through a duct 29.

In the tube 25 there is a calibrated constriction 30 which enables a constant quantity of dialysis liquid to flow out towards the container 26.

The liquid from the tubes 24 and 25 flows into the upper part of the container 26 by dripping. Thus there is a discontinuity in flow between the cover 46 of the container 26 and the level of liquid in the container. This means that the tubes 24 and 25 and the cover 41 of the container 26 can be disposable, while the container 26 and the relative components, which will be described hereinafter, constitute a fixed part of the device and do not require to be sterilized. These fixed parts may thus be simply washed with water at the end of each treatment.

In the container 26 there is an element 31 sensitive to the temperature of the dialysis liquid, for example a thermistor, and from its base there extends a duct 32 through which a pump 33 draws the liquid from the container and feeds it through a conductivity probe or cell 34, inserted in a duct 35, 36, back into the container itself. The probe 34 is calibrated and consists of an instrument of common use, and is consequently not shown in detail.

To the terminals of the probe 34 and thermistor 31 are connected the deviator means which control the flow of liquid towards the dialyser, deviating it along the duct 24 when the thermal and conductivity characteristics of this liquid do not lie within the sheduled tolerance limits.

The deviator means comprise a reversible geared motor 37 on the exit shaft of which is keyed a cam 38 which in two assumed positions squeezes the flexible tube 24 or the flexible tube 16 against the fixed abutments 39, 40, so blocking them.

The operation of the described diluter is as follows. The degassed heated water and the concentrate, pumped by the pumps 3, 11 along the ducts 1, 9, mix in the connector 13 and the preparation obtained flows through the conductivity cell 18 where, as stated, its conductivity is measured.

If the measured values do not lie within the required limits of tolerance, the regulating device acts on the speed and consequently on the flow of the concentrate pump 11, so supplying an adequate correction.

Simultaneously the cam 38 is brought into a position in which it blocks the duct 16, because of which the dialysis liquid flows towards the container 26 through the duct 24, and then to the drain pot 28.

When the conductivity of the preparation has returned to normal, the deviator 38 opens the passage towards the dialyser 17, and blocks that towards the container 26, into which therefore flows only that portion of the stream which flows along the duct 25.

Through the container 26 the pump 33 circulates liquid which is continuously renewed because of the constant inflow of liquid through the constriction 30 and which has a practically constant temperature and conductivity because these are already previously corrected and maintained within very small limits.

Because of the small flow of liquid into the container 26 in relation to the liquid contained there, any variations in temperature influence to a negligible extent the conductivity of the liquid, which consequently is influenced almost exclusively by the concentration ratio of the water to the concentrate which form the preparation. If the temperature does not lie within the allowed tolerance limits, a command is fed to the geared motor 37 by which the cam 38 is made to rotate in such a direction that it squeezes the tube 16 against the abutment 40, so stopping the flow of dialysis liquid towards the dialyser and deviating it towards the drain pot through the container 26. When the temperature becomes normal, the deviator is returned to its initial position.

It can be seen that the concentrate diluter perfectly attains the proposed objects. In fact besides the high reliability because of the final control in the container 26, all the ducts which extend from the mainfold to the dialyser can be easily removed and replaced by others which have been previously sterilized, so simplifying sterilization and perfectly guaranteeing this latter.

According to a preferred embodiment of the invention, the flow of dialysis liquid is regulated in accordance with requirements by providing the possibility of varying the rotational speed of the drive member 8 which drives the pump 3, with automatic adjustment of the rotational speed of the pump 11 to maintain the required dilution ratio constant, this latter being set by a simple graduated handle which acts on the electronic control means included between the probe 18 and pump 11.

I claim:

1. Concentrate diluter for preparing dialysis liquid in artificial kidneys, comprising a flexible duct for feeding water which has been previously degassed and heated to a predetermined temperature, and a flexible duct for feeding the concentrate, means for the peristaltic pumping of the degassed water and the concentrate along said ducts, a connector for said ducts arranged to mix the water with the concentrate and convey the preparation so obtained towards the dialyser through a duct along which is disposed a conductivity cell on which depend the means for regulating the dilution of concentrate in the degassed water, a container provided with an overflow and connected to the feed duct for the dialyser by a pair of ducts, one of which feeds a constant fraction of the preparation to the container, and a flow deviator arranged to block the flow of the preparation towards the dialyser, leaving simultaneously open the second of said pair of ducts or vice versa, there being also provided means for measuring the temperature and conductivity of the liquid in the container, and which govern said deviator.

2. Diluter as claimed in claim 1, in which said means for measuring the conductivity of the liquid contained in the container comprise a pump for drawing the liquid contained in the container and feeding it back into the container through a conductivity probe.

3. Diluter as claimed in claim 1, in which the conductivity cell comprises two coaxial metal sleeves connected together by an intermediate tubular portion of insulating plastics material of a thickness such that its internal bore is equal to that of the sleeves, on the opposite ends of these latter there being fixed caps provided with conical portions for inserting the cell into the delivery duct for the dialysis liquid and spaced from the intermediate tubular portion so as to leave uncovered areas of the sleeves for connecting electric terminals for serving the electronic devices for regulating the dilution of the dialysis liquid.

4. Diluter as claimed in claim 1, in which the pair of ducts which feed into the container pass through a cover which close this latter and extend by a distance such as to determine the fall of the liquid into the container by dripping.

5. Diluter as claimed in claim 1, in which in the outlet of said connector there is a cylindrical spiral which favours mixing of the degassed water with the concentrate.

6. Diluter as claimed in claim 1, in which means are provided for regulating the flow of dialysis liquid according to requirements, which vary the rotational speed of the pump which feeds the concentrate in such a manner that the dilution ratio remains constant.

7. Diluter as claimed in claim 1 in which said peristaltic pumps comprise three idle rollers with their axes parallel to each other, disposed at the vertices of an equilateral triangle and rotatably supported by a support element fixed to a shaft of an electric motor.

8. Diluter as claimed in claim 1, in which said flow deviator comprises a cam keyed on to the shaft of a reversible geared motor and a pair of abutments disposed in diametrically opposing positions with respect to the cam and spaced from this latter so that the cam can abut against them when it rotates in opposing directions, between the cam and the abutments there being disposed the ducts which lead to the container and to the dialyser respectively.

* * * * *